(12) United States Patent
Singh et al.

(10) Patent No.: US 11,988,832 B2
(45) Date of Patent: May 21, 2024

(54) CONCURRENT RENDERING OF CANVASES FOR DIFFERENT APPS AS PART OF 3D SIMULATION

(71) Applicant: Lenovo (Singapore) Pte. Ltd., Singapore (SG)

(72) Inventors: Kuldeep Singh, Morrisville, NC (US); Raju Kandaswamy, Morrisville, NC (US); Andrew Hansen, Morrisville, NC (US); Mayan Shay May-Raz, Morrisville, NC (US); Cole Heiner, Morrsville, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/818,346

(22) Filed: Aug. 8, 2022

(65) Prior Publication Data

US 2024/0045207 A1 Feb. 8, 2024

(51) Int. Cl.
*G02B 27/01* (2006.01)
*G06F 3/04815* (2022.01)
*G06T 15/00* (2011.01)

(52) U.S. Cl.
CPC ....... *G02B 27/017* (2013.01); *G06F 3/04815* (2013.01); *G06T 15/005* (2013.01)

(58) Field of Classification Search
CPC .. G02B 27/017; G06F 3/04815; G06T 15/005
See application file for complete search history.

(56) References Cited

U.S. PATENT DOCUMENTS

2017/0351097 A1* 12/2017 Memmott ........... G06F 3/04845
2019/0313059 A1* 10/2019 Agarawala ............ G06T 19/006
2020/0104028 A1*  4/2020 Vats .................... G06F 3/04845

OTHER PUBLICATIONS

"ThinkReality A3 Industrial Edition Applications Overview", Lenovo, updated Aug. 17, 2022. Retrieved on Jul. 16, 2022 from https://support.lenovo.com/in/en/videos/nvid500337.

* cited by examiner

*Primary Examiner* — Michelle Chin
(74) *Attorney, Agent, or Firm* — John M. Rogitz; John L. Rogitz

(57) ABSTRACT

In one aspect, a first device includes at least one processor and storage accessible to the at least one processor. The storage includes instructions executable by the at least one processor to execute a first application (app) to generate a first virtual display for rendering in a first canvas as part of a three-dimensional (3D) simulation. The instructions are also executable to execute a second app to generate a second virtual display for rendering in a second canvas as part of the 3D simulation. The instructions are then executable to concurrently render the first and second canvases at a headset as part of the 3D simulation.

20 Claims, 10 Drawing Sheets

CONCURRENT RENDERING OF CANVASES FOR DIFFERENT APPS AS PART OF 3D SIMULATION

FIELD

The disclosure below relates to technically inventive, non-routine solutions that are necessarily rooted in computer technology and that produce concrete technical improvements. In particular, the disclosure below relates to concurrent rendering of canvases for different apps as part of a 3D simulation.

BACKGROUND

As recognized herein, most modern augmented reality (AR), virtual reality (VR), and mixed reality (MR) electronic devices are limited in their ability to present a two-dimensional (2D) application (app) in 3D space as part of an AR, VR, or MR experience. There are currently no adequate solutions to the foregoing computer-related, technological problem.

SUMMARY

Accordingly, in one aspect a first device includes at least one processor and storage accessible to the at least one processor. The storage includes instructions executable by the at least one processor to execute a first application (app) to generate a first virtual display for rendering in a first canvas as part of a three-dimensional (3D) simulation. The instructions are also executable to execute a second app to generate a second virtual display for rendering in a second canvas as part of the 3D simulation. The second app is different from the first app, the second virtual display is different from the first virtual display, and the second canvas is different from the first canvas. The instructions are also executable to concurrently render the first and second canvases at a headset as part of the 3D simulation.

In certain examples, the first device may keep both of the first and second apps active by indicating concurrent hover events for each of the first and second apps to an operating system executing at the first device.

Also in certain examples, the instructions may be executable to render the first and second canvases in 3D space based on user input assigning respective positions for the first and second canvases. Thus, the instructions may be executable to render the first canvas in 3D space to remain fixed at a particular 3D location associated with a spatial anchor. Additionally or alternatively, the instructions may be executable to render the first canvas in 3D space to move through 3D space as a user moves through 3D space while maintaining the first canvas at a particular bearing relative to a forward-facing axis of the user's torso. As another example, the instructions may be executable to render the first canvas in 3D space to remain stationary within a user's field of view (FOV).

In certain example implementations, the instructions may also be executable to determine in a first instance that a 3D pointer controlled by a user intersects the first canvas according to the 3D simulation. The instructions may then be executable to direct additional user input to the first app based on the determination in the first instance that the 3D pointer intersects the first canvas. In certain implementations, the instructions may even be executable to continue to direct additional user input to the first app subsequent to determining in the first instance that the 3D pointer intersects the first canvas, prior to the 3D pointer intersecting the second canvas after intersecting the first canvas in the first instance, and based on determining that the 3D pointer does not currently intersect either of the first and second canvases. In various examples, the 3D pointer itself may remain fixed within the user's field of view (FOV) while wearing the headset and/or may be controlled by raycast.

Moreover, in various example embodiments the first device may be different from headset. Additionally or alternatively, the first device may include the headset and/or may include a mobile device that controls the headset and executes the instructions.

In another aspect, a method includes executing a first application (app) to generate a first virtual display for rendering in a first canvas as part of a three-dimensional (3D) simulation. The method also includes executing a second app to generate a second virtual display for rendering in a second canvas as part of the 3D simulation. The second app is different from the first app, the second virtual display is different from the first virtual display, and the second canvas is different from the first canvas. The method also includes concurrently rendering the first and second canvases at a headset as part of the 3D simulation.

Thus, in certain example implementations the method may include keeping both of the first and second apps active by indicating concurrent hover events for each of the first and second apps to an operating system executing at a device.

Also in certain example implementations, the method may include rendering the first and second canvases in 3D space based on user input assigning respective positions for the first and second canvases. As a specific example, the method may include rendering the first canvas in 3D space to move through 3D space as a user moves through 3D space while maintaining the first canvas at a particular bearing relative to a forward-facing axis of the user's torso.

Still further, if desired the method may include determining in a first instance that a 3D pointer controlled by a user intersects the first canvas according to the 3D simulation. Based on determining in the first instance that the 3D pointer intersects the first canvas, the method may include directing additional user input to the first app. The method may even include continuing to direct additional user input to the first app subsequent to determining in the first instance that the 3D pointer intersects the first canvas, prior to the 3D pointer intersecting the second canvas after intersecting the first canvas in the first instance, and based on determining that the 3D pointer does not currently intersect either of the first and second canvases.

In another aspect, at least one computer readable storage medium (CRSM) that is not a transitory signal includes instructions executable by at least one processor to execute a first application (app) to render a first canvas as part of a three-dimensional (3D) simulation. The instructions are also executable to execute a second app to render a second canvas as part of the 3D simulation. The second app is different from the first app and the second canvas is different from the first canvas. The instructions are also executable to concurrently render the first and second canvases at a headset as part of the 3D simulation.

The details of present principles, both as to their structure and operation, can best be understood in reference to the accompanying drawings, in which like reference numerals refer to like parts, and in which:

DETAILED DESCRIPTION

Figure 1:
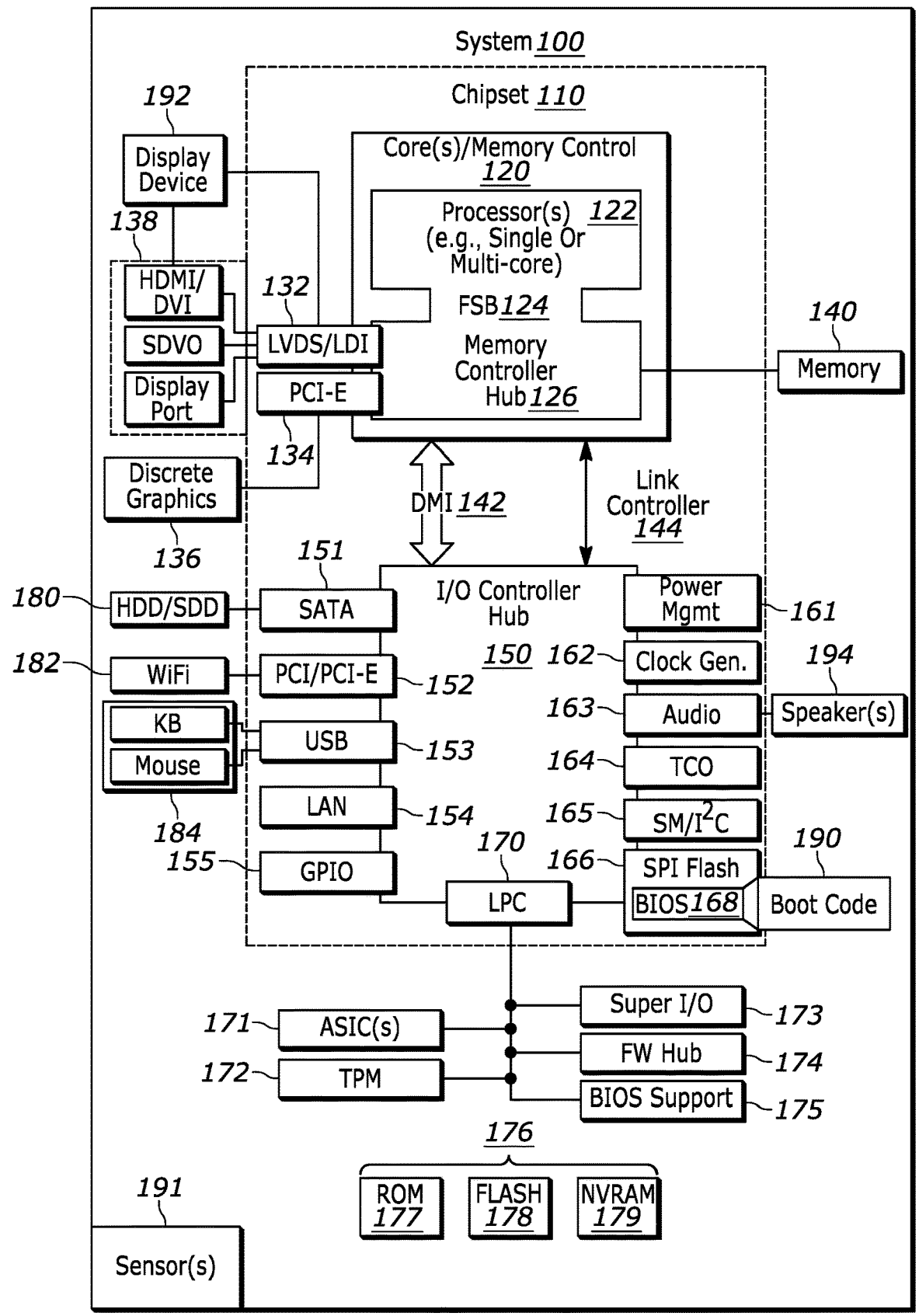
FIG. 1 is a block diagram of an example system consistent with present principles.

Among other things, the detailed description below recognizes that it is desirable for 2D mobile apps (designed for 2D space rendered on a flat screen display as may be built using a mobile device SDK such as Android's SDK) to be run in a 3D virtual environment in cross-compatible fashion. The 2D app might be Google's Chrome or Microsoft's Teams, for example. The detailed description below further recognizes that it is desirable to not require 2D app programmers to change the functioning of the 2D app itself as this is technologically complex if even possible given the numerous different types of 3D SDKs used in different headsets as the 3D SDKs are often manufacturer-specific. Likewise, the detailed description below recognizes that it is desirable to not require the 3D SDK programmers to change the functioning of the 3D SDK itself as this too is technologically complex and inhibiting.

App Space is therefore discussed below as an example of an app/SDK that may be used to make immersive 3D interactions possible for 2D apps. App Space may therefore be a mobile-based app and user interface that renders the 2D apps in a spatial environment and takes care of converting coordinates for the spatial coordinate system to coordinates for the 2D coordinate system in runtime. An app repositioning system is also disclosed as part of App Space to place the apps in three-dimensional spatial environment. Converted interactions can be extended to all the 3D interactions provided by the underlying SDK for the headset, such as raycast, scroll, swipe, long-press, double tap, gesture and voice.

Thus, in one example App Space may first render the 2D app(s) in a 3D spatial environment so that the rendered apps appear floating in front of the user. Then, when the user performs an interaction using 3D spatial methods, App Space converts the 3D interaction method and the 3D spatial coordinates at which the interaction occurred to a 2D coordinate system and interaction method recognizable by the 2D mobile app.

Accordingly, App Space may intercept the 3D AR coordinates from a 3D cursor and convert them to 2D coordinates, and covert all AR interactions such as AR clicks, AR scrolls, and AR text input to 2D app interactions such as "phone touches"/keyboard events. This architecture of App Space may therefore be flexible and leverage the capability of the headset's underlying 3D SDK, native APIs and 3D engine, making App Space's architecture open for many different platforms. In some specific examples, App Space may even be established by a 3D Container App for 2D/3D conversion, the underlying native 3D SDK of the headset itself for stereoscopic rendering and identifying/processing 3D user inputs (e.g., Lenovo's A3 Home and/or Unity), and an App Space Service. The components of coordinate conversion, square orientation, interactions, and other aspects contemplated herein may work for other platforms too (e.g., not just Android-based mobile devices but also Mac and Linux-based devices using appropriate programming code for those other platforms).

It may therefore be appreciated that a 3D version of a 2D app need not exist for 3D rendering, and that nothing in the underlying 2D app itself need be customized either. Instead, the 2D app/content may be rendered in a 3D container, and the 2D app may not even know that it is being rendered in 3D space. Rather, the 2D app continues to assume it is operating per 2D pixel coordinates.

Interactions in 3D using App Space may be done per the following examples:

As one example, a 3D pointer, such as a cursor located in the center of the user's field of view (FOV) like a 3D Gaze pointer or a Raycast emanating from an attached device (e.g., phone), may be used and serve as a 3DoF controller.

Other selection methods may include a touchpad on a phone/mobile screen that accepts tap and swipe inputs (e.g., provided by a 2D companion app), a hardware button located on the attached compute/mobile device (e.g., phone, compute pack, etc.), hand gestures, and voice commands.

Keyboard key presses may also be used, such as from Android's native on-screen keyboard or from an AR keyboard.

When an interaction event occurs, App Space may do the following in various examples:

First, convert the coordinates of the 3D pointer (cursor or raycast) to corresponding screen coordinates.

Convert the 3D selection method (tap, scroll, etc.) to one understandable by the 2D app.

Inject the respective interaction event to the underlying 2D app.

In the case of key press, these events may be received either via native on-screen keyboard or via AR keyboard and may be injected to the currently-selected text input field of the 2D app's virtual display.

AppSpace may thus convert 3D coordinates to 2D screen coordinates so that it can covert AR interactions to touch screen interactions. As for the coordinate conversion itself, note that App Space may intercept the 3D spatial coordinates (e.g., from the headset's manufacturer-provided SDK) and convert them to 2D coordinates. Also note here that App Space may not just convert 3D coordinates to 2D coordinates to provide to the 2D app running on the mobile device but may also convert 2D coordinates from the 2D app itself into 3D coordinates for passing back to the headset's 3D SDK for 3D renderings.

Before describing the coordinate calculations in detail, also note more generally that for the virtual display 2D source coordinate system, Android images may be formed by pixels and represented in the pixel coordinate system. As for the 3D spatial coordinate system, 3D textures may be bitmap images that have different origin and axis arrangements. Thus, in order to perform clicks or selections on the 2D app at the correct places (e.g., represent 3D eye gaze select actions as 2D touch events to the 2D app), a physics raycasting may be done on the 3D texture to obtain the 3D coordinates that the user is looking at. Then, with the mobile device knowing the 3D coordinates, a coordinate conversion may be performed from 3D texture space into 2D pixel space using the following functions:

Pixel $X=F$(Texture $X$), where $F=(0.5+$Texture $X)*W$

Pixel $Y=F$(Texture $Y$), where $F=(0.5-$Texture $Y)*H$

For example, (−0.3,0.2) in texture space would translate to (216, 576) as calculated below, given that width=1080 and height=1920:

Pixel $X=(0.5+(-0.3))*1080=216$

Pixel $Y=(0.5-(0.2))*1920=576$

Also note that the reverse calculation of (216,576) in 2D pixel space may translate into (−0.3,0.2) in texture space as given by the following functions:

Texture $X=F$(Pixel $X$), where $F=($Pixel $X/W)-0.5$

Texture $Y=F$(Pixel $Y$), where $F=0.5-($Pixel $Y/H)$

With the coordinate conversions themselves being set forth, immersive interactions for which the conversions may be used will now be discussed.

Interactions in 3D space (that may be translated to 2D interactions using App Space) may occur using any number of different 3D input modalities, including but not limited to gaze pointer, raycast, hand/arm gestures, and voice input. These interactions and input modalities may be supported for any 3D app using the headset manufacturer's SDK (e.g., the ThinkReality SDK) and/or App Space itself. Events may thus be injected via Virtual Display APIs to the underlying 2D app. Below are descriptions of how different interactions may be performed in App Space or whatever 3D to 2D conversion app is being used.

For click/select interactions, App Space may inject a finger touch event at pixel coordinates converted from the cursor pointer location in Unity when a gaze select event or companion app tap event or other event occurs. The following is Android code for the injection:

```
public void click(int displayID, final int x, final int y) {
    long 11owntime = SystemClock.uptimeMillis( );
    //These injectMotionEvents is to perform Tap
    injectMotionEvent(displayID, MotionEvent.ACTION_DOWN, 11owntime, 11owntime, x, y);
    long eventTime = SystemClock.uptimeMillis( );
    injectMotionEvent(displayID, MotionEvent.ACTION_UP, 11owntime, eventTime, x,y);
}
```

For longpress interactions the long press may be supported by long-pressing of a button on the headset (e.g., the Lenovo A3 glass Center Key button) for a threshold amount of time such as two seconds, or a longpress on the companion mobile app/display/trackpad. App Space may then inject finger touch events (ACTION_DOWN using finger, hold it down and then after a delay lifting finger using ACTION_UP) according to the following Android code:

```
public void longPress(int displayID, final int x, final int y) {
    long 11owntime = SystemClock.uptimeMillis( );
    injectMotionEvent(displayID, MotionEvent.ACTION_DOWN, 12owntime, 12owntime, x, y);
    Thread.sleep(ViewConfiguration.getLongPressTimeout( ) + LONG_PRESS_TIMEOUT_BUFFER);
    12owntime = SystemClock.uptimeMillis( );
    long eventTime = SystemClock.uptimeMillis( );
    injectMotionEvent(displayID, MotionEvent.ACTION_UP, 12owntime, eventTime, x, y);
}
```

For back button interaction, back functionality may be supported in an AR user interface (UI) at the headset (e.g. Lenovo A3 using App Space) as well from the 2D companion app/mobile device itself. App Space may thus inject a keyboard event with KEYCODE_BACK into the 2D app as follows:

```
public void goBack(int displayID) {
  serviceConnection.injectKeyEvent(new KeyEvent(ACTION_DOWN,
KEYCODE_BACK), displayID);
  serviceConnection.injectKeyEvent(new KeyEvent(ACTION_UP,
KEYCODE_BACK), displayID);
}
```

Note that similar programming language and a corresponding keycode may be used for a "close" command to close a window or other graphical object.

For scroll interactions, scrolling may be supported in an AR UI at the headset (e.g., Lenovo A3 using App Space) by injecting mouse scroll events (ACTION_SCROLL for TOOL_TYPE_MOUSE). Thus, AR UI scrolls via Scroll Up/Down buttons may be performed as a fixed-step scroll. Scrolling from the 2D companion app trackpad or touch-enabled display (e.g., up/down/left/right scroll gestures) may also be supported as continuous scrolls and App Space may thus inject scroll events based on the velocity and distance covered on trackpad.

For double tap/double-click interactions, double taps on the 2D companion app/mobile device display may also be supported similar to the click/select interactions set forth above but to establish a 2D double tap.

Turning now to text input modalities for conversion to 2D coordinates for passing of text input to the 2D app on the mobile device, the initial text input may be performed via an on screen 3D keyboard in AR/VR as presented at the headset, or via a keyboard as presented on the display of the mobile device. If the input is provided to the native 3D keyboard or to the mobile device keyboard, the key input for whatever key is selected may be passed to the 2D app. For input to a keyboard from a 2D app executing at the mobile device (or from the mobile device itself) but as presented in 3D virtual space on the headset display, App Space may intercept all the key events and inject to the focused Virtual Display using Android's virtual display APIs according to the coordinate conversions discussed above (e.g., based on the 3D coordinates of a gaze pointer or raycast being used for key selection).

Still in terms of different 3D user interactions that may be injected into a 2D app as a 2D action, the following table further illustrates. This table may be thought of as a key map indicating how various user interactions are converted to Android terms for injection into an Android-based 2D app. Thus, the table below sets forth various events and their corresponding Android mapping. The Android Key codes may be provided through the Android SDK. Thus, the appropriate events may be generated programmatically for each type of user interaction indicated in the event column as follows:

| Event | Android Key Code | Comments |
|---|---|---|
| Click | MotionEvent.ACTION_DOWN MotionEvent.ACTION_UP | Two motion events are programmatically generated and passed on, first event ACTION_DOWN followed by ACTION_UP |
| Hover | MotionEvent.ACTION_HOVER_MOVE | Whenever gaze movement is detected over the AppSpace canvas an ACTION_HOVER_MOVE event is programmatically generated and fired |
| Keyboard | KeyEvent.ACTION_DOWN KeyEvent.ACTION_UP | Whenever a key is pressed in AR Keyboard, two key events are generated and fired programmatically, ACTION_DOWN followed by ACTION_UP. Both events will also have the same key code of the key being pressed. For example, for the enter key press, "KeyEvent.KEYCODE ENTER" will be present in both ACTION_DOWN and ACTION_UP |
| Long Click | MotionEvent.ACTION_DOWN Thread.Sleep(200) MotionEvent.ACTION_UP | Similar to click, but in between ACTION_DOWN and ACTION_UP, a programmatical delay (sleep) of 200 ms is introduced to simulate interval |
| Back | KeyEvent.ACTION_DOWN KeyEvent.ACTION_UP | Similar to keyboard events, but the generated event will have the key code as KeyEvent.KEYCODE_BACK |
| Horizontal Scroll | MotionEvent.AXIS_HSCROLL MotionEvent.ACTION_SCROLL | First AXIS_HSCROLL will be called to set the amount of scroll followed by the ACTION_SCROLL programmatically |
| Vertical Scroll | MotionEvent.AXIS_VSCROLL MotionEvent.ACTION_SCROLL | First AXIS_VSCROLL will be called to set the amount of scroll followed by the ACTION_SCROLL programmatically |

| Event | Android Key Code | Comments |
| --- | --- | --- |
| Fling | MotionEvent.ACTION_DOWN<br>MotionEvent.ACTION_MOVE<br>MotionEvent.ACTION_UP | First ACTION_DOWN followed by a bunch of ACTION_MOVE and finally ACTION_UP. All events generated and fired programmatically |
| Double Tap | MotionEvent.ACTION_DOWN<br>MotionEvent.ACTION_UP | Similar to click, but fired twice in short intervals programmatically |

Furthermore, App Space as may be used in a ThinkReality A3 (or other headset) may not only show native 2D app screens in 3D but also have a communication mechanism to communicate with the 2D app to develop a seamless 2D and 3D experience where developers can build 3D apps but still build 2D screens in their favorite 2D tools.

Thus, App Space may be made available for various headsets and can be used to combine the 2D and 3D developer experience. It can be part of a headset SDK, for example. Accordingly, in one specific example, the development tool Unity3D may be used for building AR/VR applications and provide ways to design and develop applications for a 3D environment. This might include 2D screens for pictures, videos, pdf/text documents, and other graphical items. App Space may thus be used to render 2D app screens in AR glasses and other headsets, making immersive AR interactions possible for 2D apps screens. App Space may also be extended as a developer tool for Unity3D and other development tools so that, using it, developers can bring any 2D content/screen from existing 2D phone apps to within the 3D AR/VR application. This may enable 3D app developers to reuse existing 2D app screens, and design and develop a hybrid experience. Thus, App Space Solution may include a 3D app package and mobile service that brings 2D apps in a 3D space and bring any 2D screen from the phone app in 3D scene, and/or show 2D content like video, text, a webpage, or an image from the 2D phone app by placing them in 3D. 3D apps can include 2D app screens and have seamless communication between 2D and 3D by ThinkReality SDK-provided interfaces (e.g., App Space-provided interfaces). Thus, a 2D screen may be opened in a 3D app and both 2D and 3D apps can co-exist.

As indicated above, a mobile app for AR glasses sometimes referred to as AppSpace in specific examples can show multiple phone apps in AR glasses at a time. Multiple apps can be rendered simultaneously, with only one app receiving focus at any given time in certain example implementations. The focused app may be determined as the one which most recently was in the center of the user's FOV, and any interactions will be sent to this focused app. Also the multiple windows may be arranged spatially in the preferred location by the user using the tools provided around the window.

Thus, an application-level implementation may be used to show multiple 2D apps at time. AppSpace may create one virtual display per app, and let the user interact with the apps in space, one at a time. The Unity 3D engine with ThinkReality SDK may take care of stereo rendering of content for head mounted smart glasses and other headsets. AppSpace can render one or more 2D mobile apps simultaneously, where each is rendered in its own virtual display canvas. Spatial placement of these 2D canvases is managed by the 3D engine using the additional UI controls implemented in the AppSpace, and the location of each canvas can be implemented as one of the following. First, remain locked to the same position in world space (e.g., remains in the same physical location relative to the surrounding environment, regardless of how the user moves or turns within that environment). Second, follow the user's position but not rotation (e.g., remains locked in position relative to the user, moving as the user moves but remaining stationary as the user turns, so that the canvas is always located in the same direction from the user's current location and torso direction). Third, remain locked to the user's FOV (e.g., moves constantly relative to world space while always remaining in the same location of the user's FOV).

Once the app is locked in 3D space as desired, several buttons may then appear alongside of the edges of the app. In certain example implementations, these buttons may only be visible on the app/canvas the user is looking at or last looked at. Focus of a selected app may change using an AR cursor coming out of user's forehead (e.g., gaze cursor).

As an example for presenting the canvases of multiple apps, upon launch of the apps, repositioning tools may be used. E.g., the user may be asked to confirm the placement of each app at the start using Move Tools, and once a canvas's position is confirmed it may be locked to the world.

Thereafter, the user at any time can use repositioning tools (e.g., Move Tools), and while the app is in move mode that app may remain head/FOV-locked in the user's field of view, and hence follow the user (e.g., as the user moves through space). The underlying app/canvas may not be interactable during this move mode/time to avoid any miss operation. The user may therefore engage in six degrees of freedom (DOF) positioning of the canvases, and the user can even go closer to the app and can roam around it (e.g., once anchored).

As for launching multiple apps, a user can launch three phone apps (or more or less) at a time from the main launcher or via a mini launcher within the AppSpace app (e.g., the user may change the number of apps based on activity). The user can then place the apps in the 3D space around them. For example, the user can place the Teams app on the left, Chrome in front, and the YouTube app on the right, so that the user can use all of them in 3D space.

Thus, in one specific example implementation, when a 2D app is selected to move in 3D space, its canvas may move with user head movement with slight delay (e.g., moved via gaze pointer or raycast), and the moment the user selects an exit/confirm button then the device places the canvas at the selected position in space. In fact, at the start of any app the user may confirm the associated canvas's position in space. As for depth, the user can also change the depth of the canvas (e.g., the distance of the canvas from the headset), as may be managed by the 3D engine. Occlusion and layers may also be handled by the 3D engine. As for scale, the user may also resize the canvases as per their choice, and the resized area may then be handled during using the coordinate systems conversion calculations disclosed herein.

Additionally, as for alerts and notifications, the handling of mobile alerts and notifications may be done at different layers so that a notification may always be presented to the user in certain examples. For instance, AppSpace may intercept app-level notifications and shown them in the headset. A system notification canvas may also be used and can show system notifications at runtime in the headset.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino CA, Google Inc. of Mountain View, CA, or Microsoft Corp. of Redmond, WA. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any single- or multi-chip processor that can execute logic by means of various lines such as address lines, data lines, and control lines and registers and shift registers. Moreover, any logical blocks, modules, and circuits described herein can be implemented or performed with a system processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, solid state drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library. Also, the user interfaces (UI)/graphical UIs described herein may be consolidated and/or expanded, and UI elements may be mixed and matched between UIs.

Logic when implemented in software, can be written in an appropriate language such as but not limited to hypertext markup language (HTML)-5, Java®/JavaScript, C# or C++, and can be stored on or transmitted from a computer-readable storage medium such as a random access memory (RAM), read-only memory (ROM), electrically erasable programmable read-only memory (EEPROM), a hard disk drive or solid state drive, compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, NC, or a workstation computer, such as the ThinkStation®, which are sold by Lenovo (US) Inc. of Morrisville, NC; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together.

Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode (LED) display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more universal serial bus (USB) interfaces 153, a local area network (LAN) interface 154 (more generally a network interface for communication over at least one network such as the Internet, a WAN, a LAN, a Bluetooth network using Bluetooth 5.0 communication, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes basic input/output system (BIOS) 168 and boot code 190. With respect to network connections, the I/O hub controller 150 may include integrated gigabit Ethernet controller lines multiplexed with a PCI-E interface port. Other network features may operate independent of a PCI-E interface. Example network connections include Wi-Fi as well as wide-area networks (WANs) such as 4G and 5G cellular networks.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

As also shown in FIG. 1, the system 100 may include one or more sensors 191. The sensors 191 may include, for example, one or more cameras that gather images and provide the images and related input to the processor 122. The camera(s) may be webcams and/or digital cameras, but may also be thermal imaging cameras, infrared (IR) cameras, three-dimensional (3D) cameras, and/or cameras otherwise integrated into the system 100 and controllable by the processor 122 to gather still images and/or video. Thus, for example, one or more forward-facing cameras might be on a headset being worn by a user so that the system 100 may execute computer vision (e.g., for 3D real-world location tracking), and one or more inward-facing cameras might also be on the headset for eye tracking.

In addition to or in lieu of the foregoing, the sensors 191 may include one or more inertial measurement sensors that might be included in an inertial measurement unit (IMU) for location tracking and device orientation identification (e.g., dead reckoning for location tracking, orientation identification to determine whether to present content in landscape or portrait orientation). For example, the system 100 may be embodied in a mobile device and the inertial measurement sensors may be located on the mobile device to determine whether the user is holding the system 100 in portrait orientation where the long axis of the device/display is oriented vertically or in landscape orientation where the long axis of the device/display is oriented horizontally. Example inertial measurement sensors include magnetometers that sense and/or measure directional movement of the system 100 and provide related input to the processor 122, gyroscopes that sense and/or measure the orientation of the system 100 and provide related input to the processor 122, and accelerometers that sense acceleration and/or movement of the system 100 and provide related input to the processor 122.

Additionally, though not shown for simplicity, in some embodiments the system 100 may include an audio receiver/microphone that provides input from the microphone to the processor 122 based on audio that is detected, such as via a user providing audible input to the microphone as a voice command as described herein. The system 100 may also include a global positioning system (GPS) transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
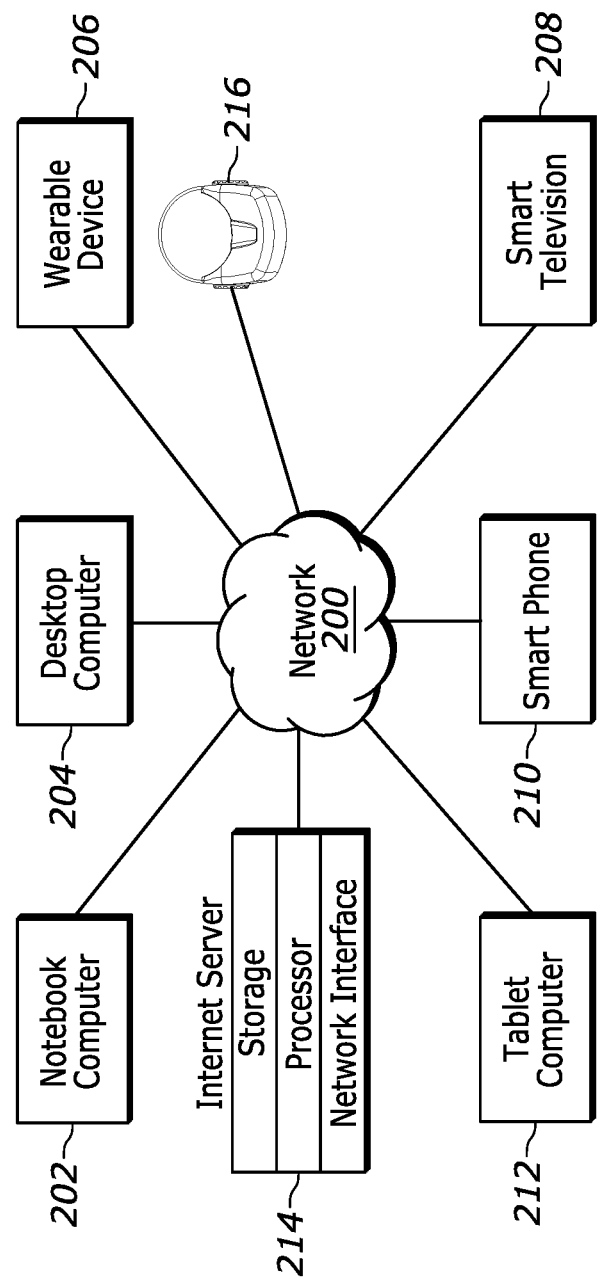
FIG. 2 is a block diagram of an example network of devices consistent with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, a headset 216, and a server 214 such as an Internet server that may provide cloud storage accessible to the devices 202-212, 216. It is to be understood that the devices 202-216 may be configured to communicate with each other over the network 200 to undertake present principles.

Figure 3:
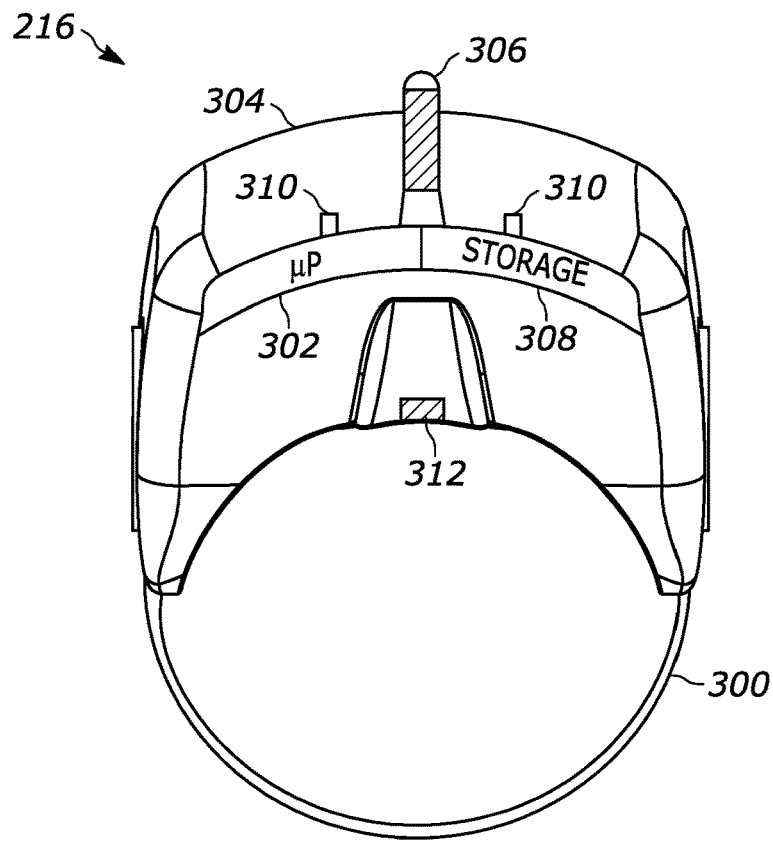
FIG. 3 illustrates an example headset that may be used to present an AR, MR, or VR presentation consistent with present principles.

Now describing FIG. 3, it shows a top plan view of an example headset consistent with present principles, such as the headset 216 referenced above. The headset 216 may include a housing 300, at least one processor 302 in the housing 300, and a non-transparent or transparent "heads up" display 304 accessible to the at least one processor 302 and coupled to the housing 300. The display 304 may for example have discrete left and right eye pieces as shown for presentation of stereoscopic images and/or 3D virtual images/objects using augmented reality (AR) software, virtual reality (VR) software, and/or mixed reality (MR) software.

The headset 216 may also include one or more forward-facing cameras 306. As shown, the camera 306 may be mounted on a bridge portion of the display 304 above where the user's nose would be so that it may have an outward-facing field of view similar to that of the user himself or herself while wearing the headset 216. The camera 306 may be used for SLAM, computer vision, image registration, spatial mapping, etc. to track movements of the wearer/headset 216 within real-world space and map the movements to virtual space. The camera 306 may also be used for gesture recognition to recognize gestures made by the user using their hand, arm, etc. consistent with present principles. However, further note that the camera(s) 306 may be located at other headset locations as well. Also note that in some examples, inward-facing cameras 310 may also be mounted within the headset 216 and oriented to image the user's eyes for eye tracking while the user wears the headset 216 (e.g., to determine where a user is looking in 3D space to select a real world or graphical object).

Additionally, the headset 316 may include storage 308 accessible to the processor 302 and coupled to the housing 300, a microphone 312 for detecting audio of the user speaking voice commands, and still other components not shown for simplicity such as a network interface for communicating over a network such as the Internet and a battery for powering components of the headset 216 such as the camera(s) 306. Additionally, note that while the headset 216 is illustrated as a head-circumscribing VR headset, it may also be established by computerized smart glasses or another type of headset including other types of AR and MR headsets. For example, the headset may be established by an AR headset that may have a transparent display that is able to present 3D virtual objects/content.

Before describing FIG. 4, it is to be understood that an app sometimes called App Space/AppSpace below may handle coordinate conversions and action/event translations between a headset's own SDK that might be provided by the headset's manufacturer (and that presents 3D content stereoscopically and manages 3D user interactions) and a 2D app operating on a connected smartphone. Thus, App Space may make immersive AR/VR/MR interactions possible for 2D apps that have not been configured for 3D space. App Space may therefore render the 2D apps in a 3D spatial environment, as well as convert 3D coordinates in the 3D spatial coordinate system into 2D coordinates in the 2D coordinate system at runtime (and vice versa). Thus, an app repositioning system is enabled by App Space to place the 2D apps in the 3D spatial environment (e.g., in square orientation by default). App Space's coordinate conversions can be extended to all the interactions afforded by the underlying 3D headset SDK, such as raycast, scroll, swipe, long-press, double tap, gesture and voice.

Figure 4:
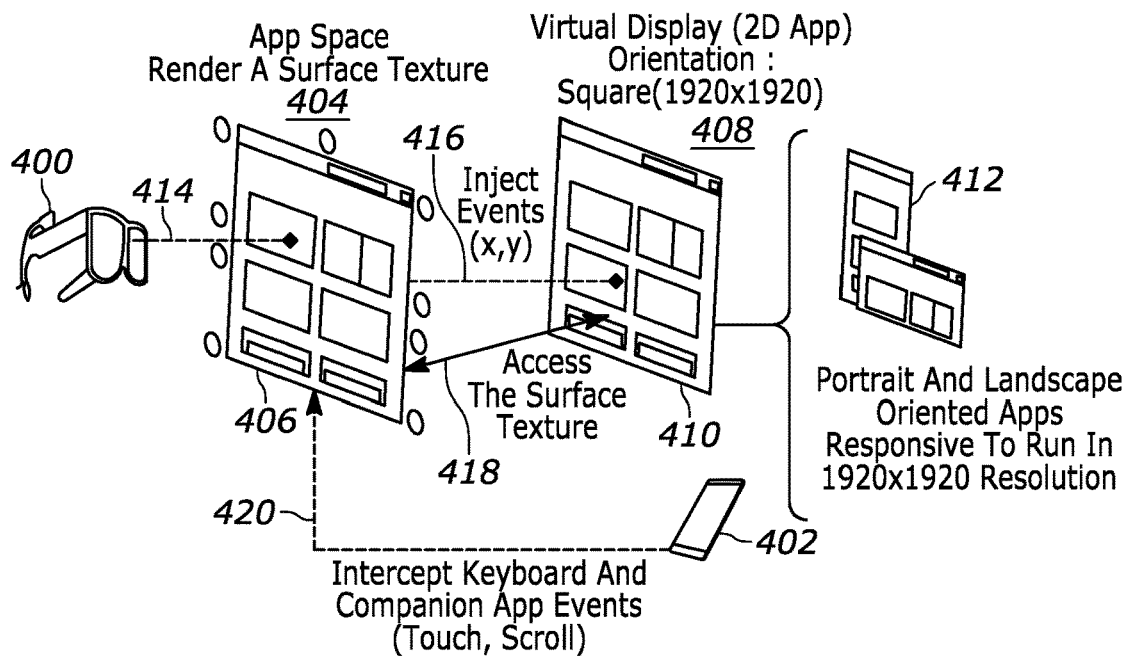
FIG. 4 is a schematic of example hardware and software architecture for content rendering consistent with present principles.

Now specifically in reference to FIG. 4, it shows a schematic of example hardware and software architecture. Thus, a headset 400 is shown and may be similar to the headset 216 described above. A mobile device 402 is also shown, where the mobile device 402 may be a smartphone, tablet computer, laptop computer, or other computing device.

FIG. 4 also shows that a first app 404—App Space in non-limiting examples—may execute at the device 402 to stereoscopically render a surface texture/canvas 406 in 3D coordinates on the display of the headset 400 and hence to a wearer of the headset 400. The device 402 may also execute a second app 408 that is already configured to present content in 2D coordinates on the display of the device 402 itself. Thus, the 2D app may be executed for the device 402 to present a virtual display 410 in, for example, square orientation in 1920×1920 pixel format by default once portrait and/or landscape-oriented presentations 412 of the 2D app have been converted into square orientation by the device 402 (e.g., by App Space itself, by the guest operating system such as Google's Android, by another app executed by the GOS such as a news app or weather app that accesses the internet to present visual content and is running on the device 402, and/or by APIs of Android (an Android Virtual Display Service)). The content of the virtual display 410 may then act as the base for the content of the surface texture/canvas 406 that is rendered in 3D, with it being reiterated that the virtual display 410 may be generated by the guest operating system (GOS) of the mobile device itself (e.g., Android). The virtual display 410 (and by extension, the texture/canvas 406) may also have the same frame rate (e.g., 60 Hz) as the frame rate for the underlying 2D app itself as would be used to present the 2D app's content on the mobile device's own display.

Thus, as shown by line 414, the surface texture 406 is projected into the user's 3D view while wearing the headset 400 (by App Space 404 itself or after App Space 404 provides the surface texture 406 to the headset's own 3D SDK app for 3D rendering (which may be a separate app than App Space itself)), with App Space 404 initially accessing/generating the surface texture/canvas 406 using the virtual display 410 of the 2D app 408 (as demonstrated by line 418). Additionally, 3D events and actions taken by the user in 3D space while interacting with the 3D virtual environment may be injected into the 2D virtual display space 410 running on the device 402 in x,y pixel coordinates once converted into those coordinates by App Space 404, as demonstrated by line 416. App Space 404 may also intercept keyboard and other app events executing at the companion 2D app 408 and represent them in the 3D surface texture 406, as represented by line 420. For instance, touches to the touch-enabled display of the device 402 may be intercepted, as may scroll events.

Accordingly, as understood herein, in non-limiting examples App Space 408 may be a 3D app package and mobile service that bring 2D apps into a 3D space app. The App Space service may wrap underlying OS Virtual Display application programming interfaces (APIs). 2D apps may be opened in the secondary virtual display 410 for which the surface texture is accessible to App Space in a 3D engine. App Space may thus render the surface texture 406 in 3D space and manage the texture 406 with additional user interface (UI) controls. App Space may detect gaze, raycast, keyboard, and keypress events from any buttons on the head-mounted headset 400 itself or even other controller devices (such as 3D hand-held controllers) via the headset's own SDK for 3D rendering. All the detected events may then be injected to the respective virtual display 410 at the intercepted coordinates and thus to the underlying 2D app 408.

Also note that, using App Space, multiple 2D apps can be rendered at the headset 400 concurrently and placed in the 3D space along a 360-degree field of view for the user's convenience. Thus, the 2D apps may be assigned a spatial anchor in 3D coordinates to keep the 2D content virtually presented in 3D at a particular real world location (for AR) or virtual world 3D location (for VR).

Thus, in one example embodiment per the schematic of FIG. 4, the following environment may be used (although present principles may also be extended to other setups as well). First, the head mounted display device 400 itself may be a Lenovo ThinkReality A3 device. The 3D engine that is used may be the Unity 3D engine. The headset SDK itself may be the Android SDK and/or Lenovo ThinkReality SDK. The controlling software may be the app running on the device 402, such as App Space itself. In the present non-limiting example, the computing device 402 itself is a Motorola g100 running a version of the Android operating system (OS). The virtual display technology that is used may be Android Virtual Display and/or native APIs from the underlying OS (e.g., Virtual Display APIs from underlying OS/Native layer such as Android).

Figure 5:
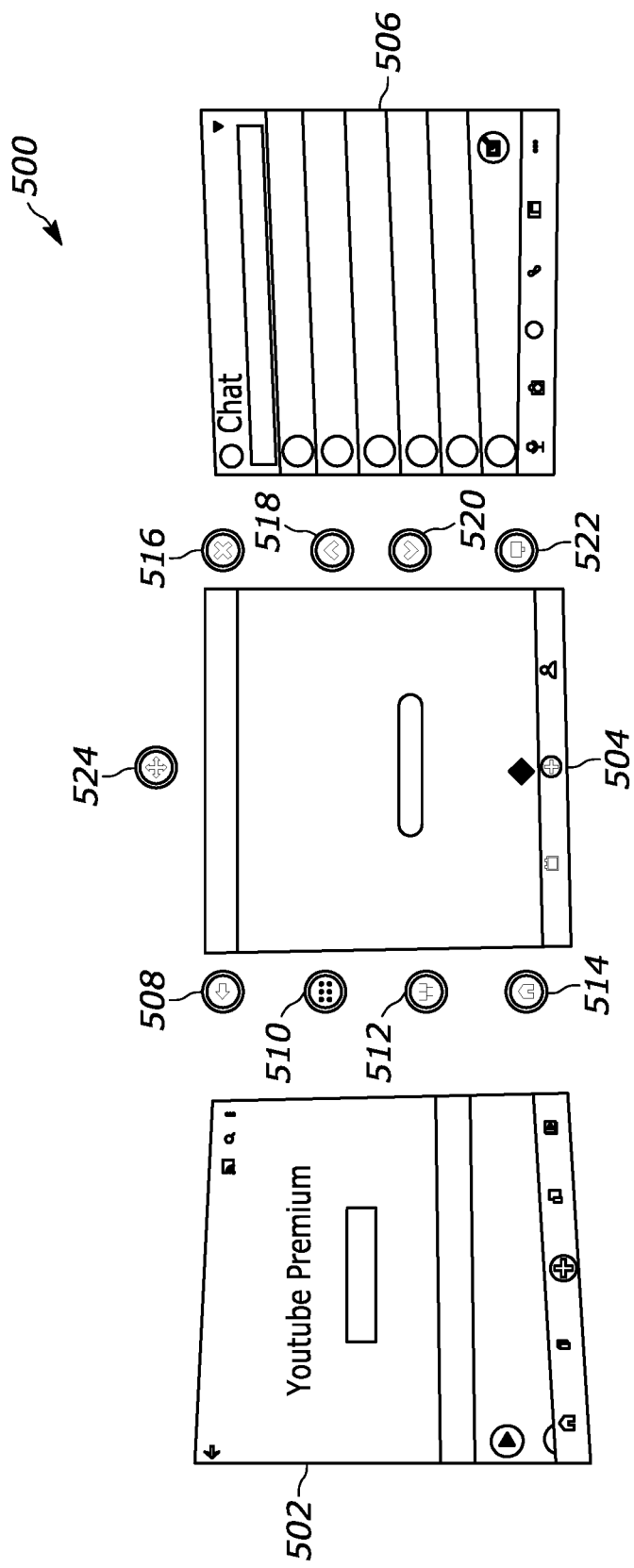
FIG. 5 shows a user's example field of view (FOV) with three canvases from three respective 2D apps being presented as part of a 3D simulation consistent with present principles.

Now in reference to FIG. 5, an example field of view (FOV) 500 is shown that a user would see while wearing a headset (such as the headset 216). As may be appreciated from FIG. 5, the FOV includes a graphical user interface (GUI) with different 3D canvases 502, 504, and 506 that include the current respective screens of respective 2D apps being executed at the connected mobile phone or other device. Thus, according to this example the canvas 502 presents a virtual display from a 2D YouTube app, the canvas 504 presents a virtual display from a 2D video conferencing app, and the canvas 506 presents a virtual display from a 2D chat or email app. Note that owing to the canvases 502-506 being presented in virtual 3D space, the canvas 502 is angled with its left edge virtually closer to the user depth-wise than its right edge, the canvas 504 is orthogonal to the user's line of sight straight ahead, and the canvas 506 is angled with its right edge virtually closer to the user depth-wise than its left edge.

As also shown in FIG. 5, various buttons/selectors are presented around the canvas 504 owing to the canvas 504 being currently selected/focused by the user based on eye gaze (the user looking at that canvas) and/or a pointer controlled by the user intersecting a portion thereof. Therefore, the buttons may be presented responsive to the mobile device identifying this user input to select the canvas 504. Example buttons that may be presented and selected to execute an associated function include a back button 508 to provide a back command to the associated 2D app, an app button 510 to present a main app launcher or mini launcher from which other 2D apps may be selected/launched for presentation in the FOV 500, a preferences button 512 to change user preferences, a home button 514 to present a home screen for the headset and/or controlling mobile device, a close button 516 to close the associated 2D app and remove it from presentation in the FOV 500, a scroll up button 518 to scroll up through the content presented in the canvas 504, a scroll down button 520 to scroll down through the content presented in the canvas 504, and a keyboard button 522 to present a keyboard in the FOV 500 for the user to then provide text input through the keyboard which is then provided to the associated 2D app of the canvas 504.

Also shown in FIG. 5 for the canvas 504 is a move button 524. The move button 524 may be selected to initiate a process for the user to move, depending on implementation, only the canvas 504 or all canvases 502-506 within the user's FOV and/or within 3D space, thereby assigning a position for the canvas. Thus, selection of the button 524 may cause the GUI 600 of FIG. 6 to be presented as a separate screen in the user's FOV 500 or to be overlaid on some or all of the FOV 500 as shown in FIG. 5.

Figure 6:
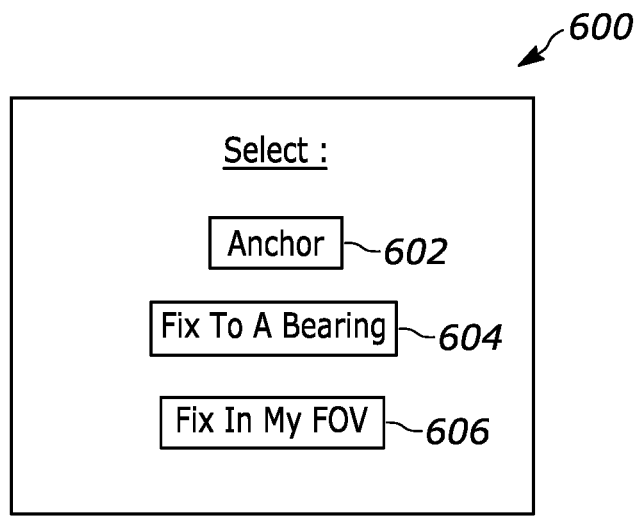
FIG. 6 shows an example graphical user interface (GUI) that may be presented on a headset display to select a way in which a canvas should be rendered in 3D space with respect to the user consistent with present principles.
Figure 7:
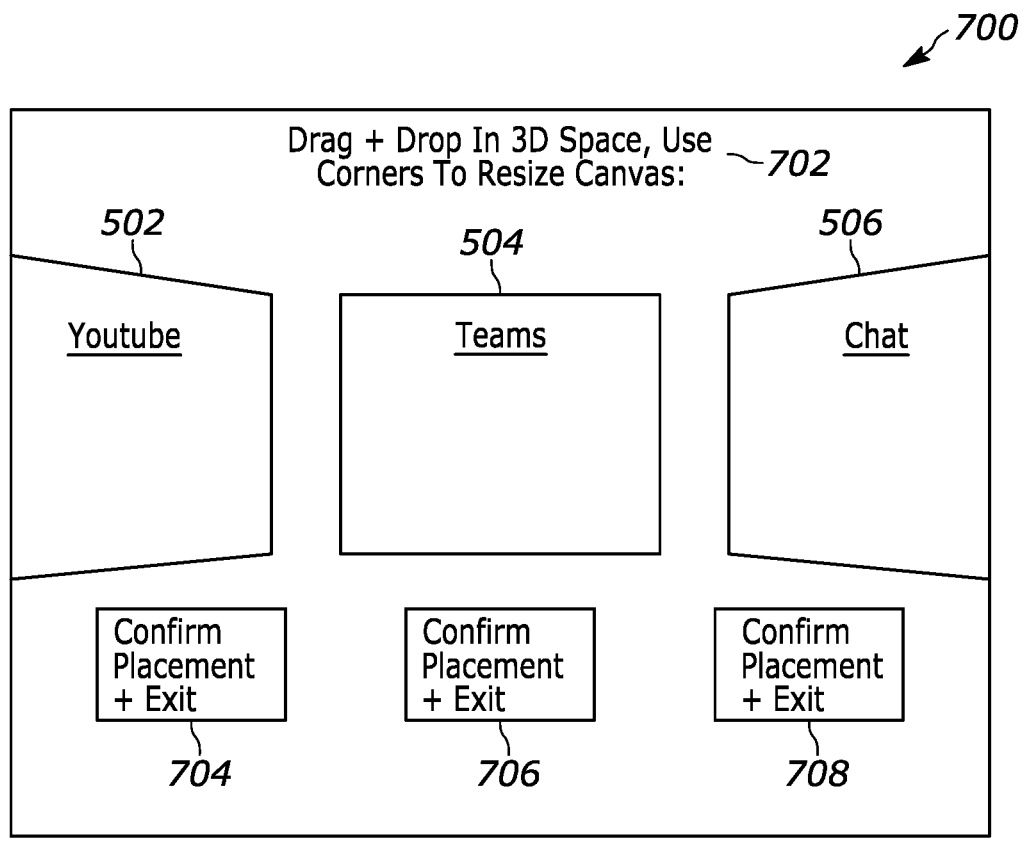
FIG. 7 shows an example GUI that may be presented as part of a 3D simulation for a user to assign the position of various canvases in 3D space consistent with present principles.

With reference to FIG. 6, the button 602 may be selected to indicate that the canvas 504 should be rendered as fixed at a particular 3D location that the user will specify next (e.g., using a spatial anchor to anchor the canvas 504 to a real-world physical location). The button 604 may be selected to indicate that the canvas 504 should be rendered in 3D space to move through 3D space as a user moves through 3D space while maintaining the canvas 504 at a particular bearing relative to a forward-facing axis of the user's torso (e.g., sometimes called "follow mode"). The button 606 may be selected to indicate that the canvas 504 should be rendered in 3D space to remain stationary within the user's FOV (e.g., FOV 500), such as directly in front of the user, or to the left or right relative to the middle of the FOV, regardless of where the user moves in 3D space and regardless of torso bearing.

Then responsive to one of the selectors 602-606 being selected, the GUI 700 may be presented, which is understood to include the FOV 500 and associated canvases 502-506. As shown, the GUI 700 includes a prompt 702 prompting the user to drag and drop a canvas presented in 3D space using a select action, such as a raycast gaze selection action, an eye gaze and corresponding hardware button press, a voice command, or other 3D select action described herein. The prompt 702 also prompts the user that the user can specifically select a corner of one of the canvases 502-506 to resize the area of the canvas within 3D space regardless of where it is placed or anchored. Thus user may then perform one or more of the actions indicated by the prompt (e.g., drag and drop, or resize) and, once the user has configured the respective canvas 502-506 within 3D space to their liking, the user may select the respective button 704, 706, or 708 presented underneath the respective canvas 502-506 (and that may follow the canvas 502-506 itself at the same relative positioning under the canvas 502-506 as the user moves it in 3D space) to set/confirm the user's placement and size configuration for the respective canvas 502-506 and exit the move screen/GUI 700.

Figure 8:
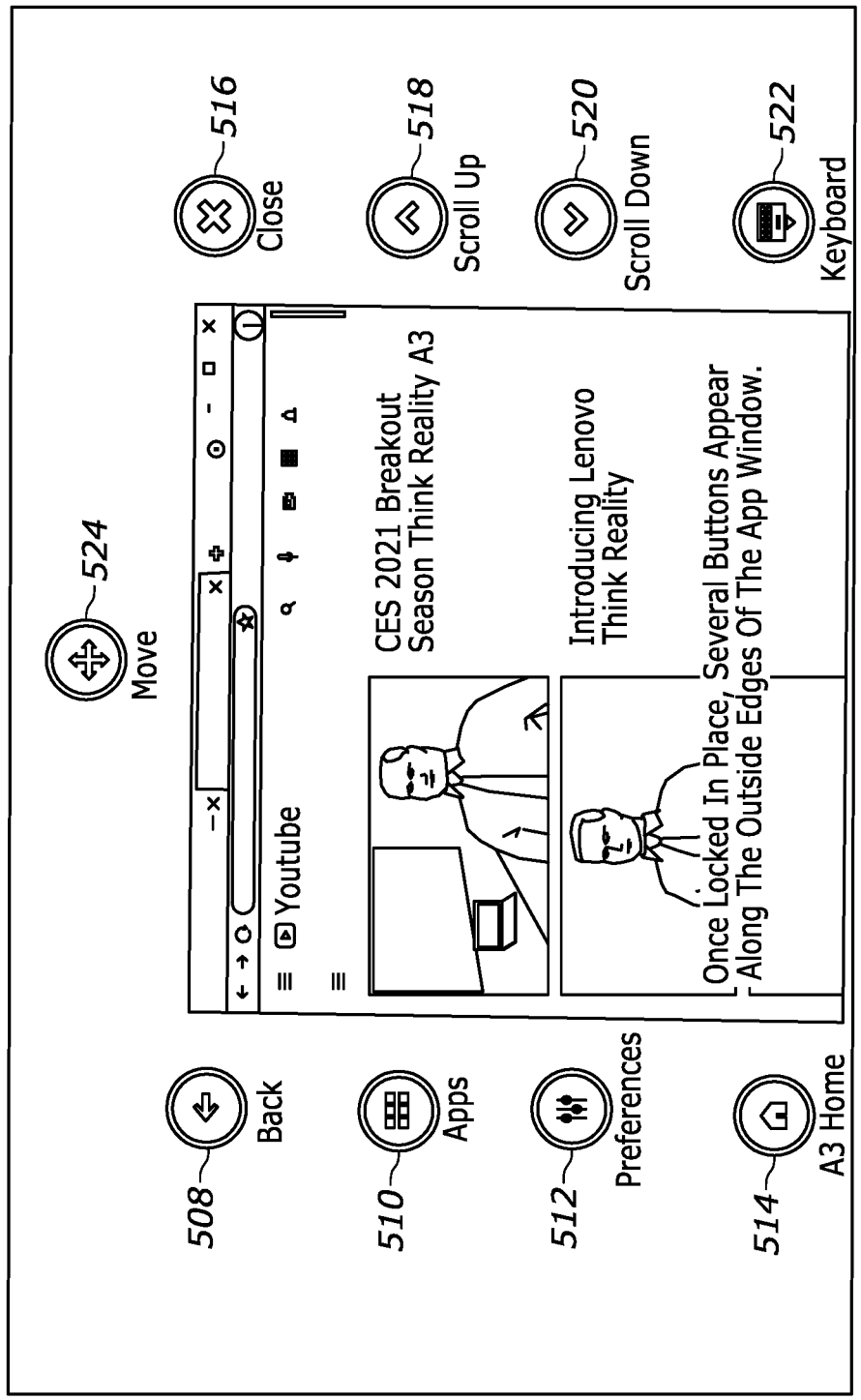
FIG. 8 shows an exploded view of part of a user's FOV to further illustrate buttons that may be presented for a canvas at which a user's selection input is focused to select that canvas consistent with present principles.

Now in reference to FIG. 8, it shows an exploded view 800 of part of the FOV 500 to further illustrate that once a respective canvas 502-506 is locked into place, the buttons 508-524 for a selected canvas may appear along the outside edges of the respective app window/canvas. The user may even move the canvas again to reposition it and the buttons (e.g., using the Move Tools button 524 to re-enter the GUI 600).

Figure 9:
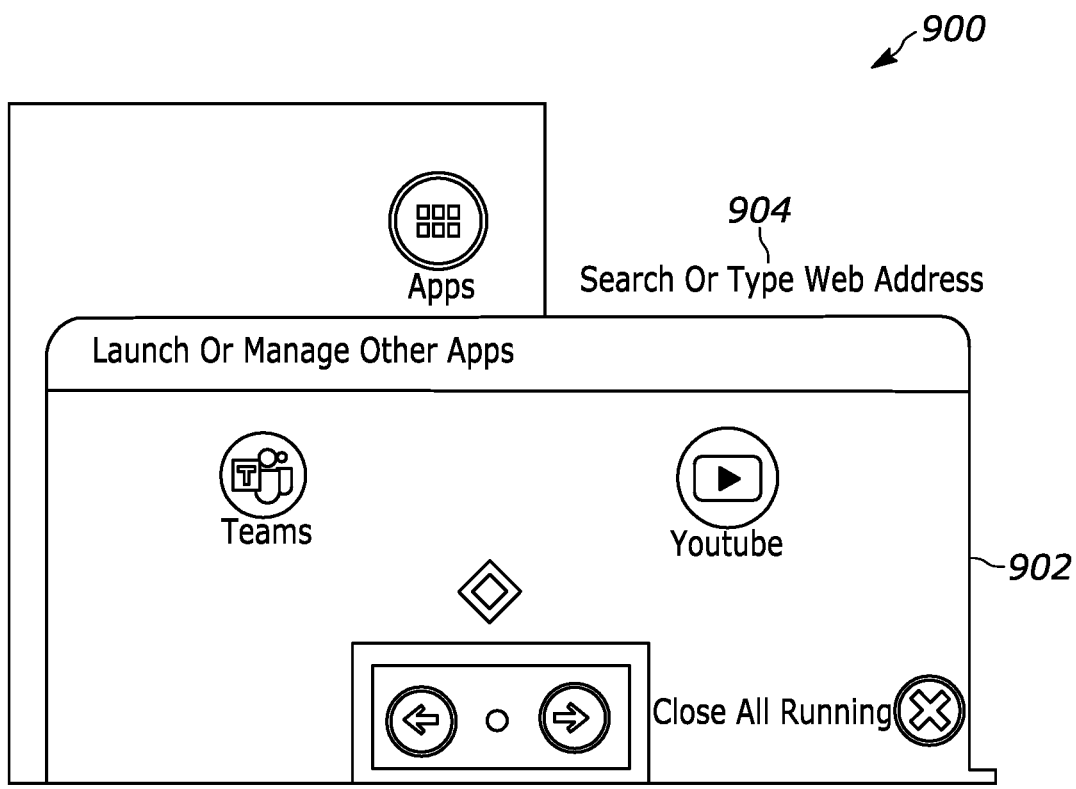
FIG. 9 shows an exploded view of two 3D canvases overlapping each other from the user's perspective while standing within 3D space with the canvases to view them consistent with present principles.

Continuing the detailed description in reference to FIG. 9, an exploded view is shown of part of a FOV 900 of the user while wearing an AR/MR/VR headset consistent with present principles. FIG. 9 illustrates that based on the user's positioning of two canvases 900 in 3D space as set forth above, a canvas 902 for a 2D video conferencing app is anchored in 3D virtual space in front a canvas 904 of a 2D Internet browser application that is being presented in follow mode.

Figure 10:
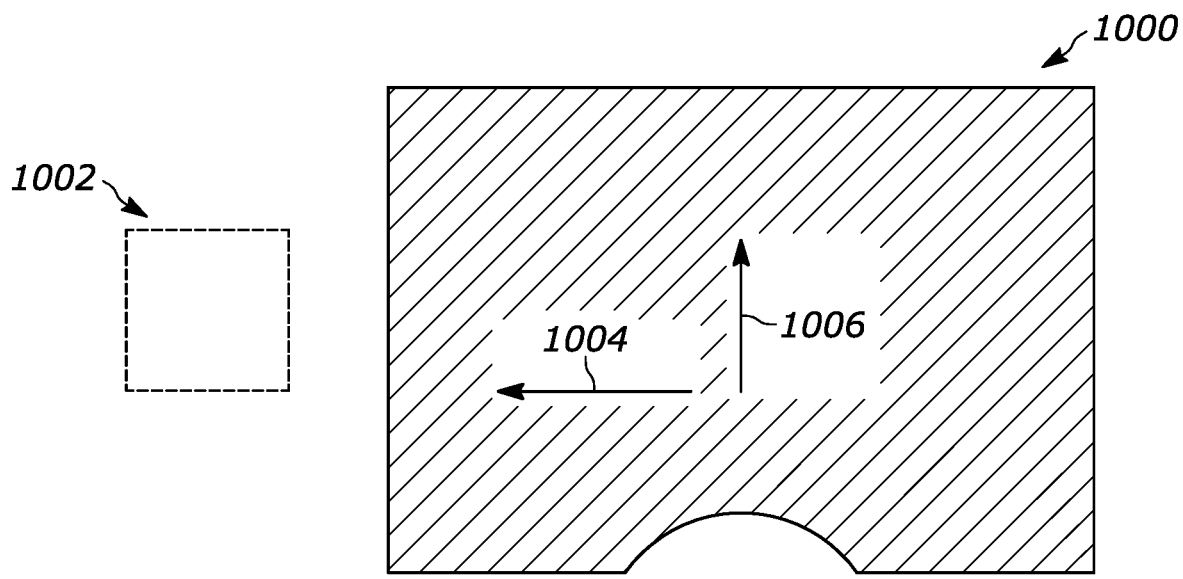
FIG. 10 shows an example FOV of the user while engaged in a 3D simulation, and also shows a canvas being rendered and maintained in 3D space at a particular bearing to the user so the user may turn to look at it while at any real-world location and whenever desired consistent with present principles.

FIG. 10 further illustrates present principles. Here a FOV 1000 of the user is shown that the user would see while wearing a headset rendering canvases consistent with present principles. FIG. 10 illustrates that a canvas 1002 may be rendered in 3D space to move through 3D space as a user moves through 3D space (e.g., walks around a room or to different rooms of a building) while maintaining the canvas 1002 at a particular bearing 1004 relative to a forward-facing axis 1006 of the user's torso (and at a particular depth relative to the torso). Torso orientation may be identified using cameras on the headset or elsewhere in the environment.

Additionally or alternatively, torso orientation may be assumed based on position tracking executed by the headset (e.g., dead reckoning using accelerometer and gyroscope data) to assume the forward-facing axis of the torso is in the same direction as movement of the user and hence headset itself through space. In certain examples, the movement of the user/headset may be required to be more than a threshold distance for the headset to distinguish between actual movement through space and mere head rotation with the torso remaining stationary.

Other techniques to track the torso may also be used. But regardless of how the torso is tracked, it is to be understood that as the user moves through space and/or engages with virtual objects presented as part of an AR/VR/MR simulation, the canvas 1002 maintains its bearing with respect to the user's torso while moving with the user through combined real/virtual 3D space (e.g., maintaining the same virtual distance from the user, at the bearing, while the user moves). Thus, each time the user wishes to view or direct input to the canvas 1002, the user may look at the canvas 1002 according to its bearing from the torso. In the present example, the bearing is to the left of the user's forward-facing torso axis 1006, and so the user may look left until the canvas 1002 comes within the FOV 1000 to then engage with the canvas 1002 while within the FOV 1000.

Figure 11:
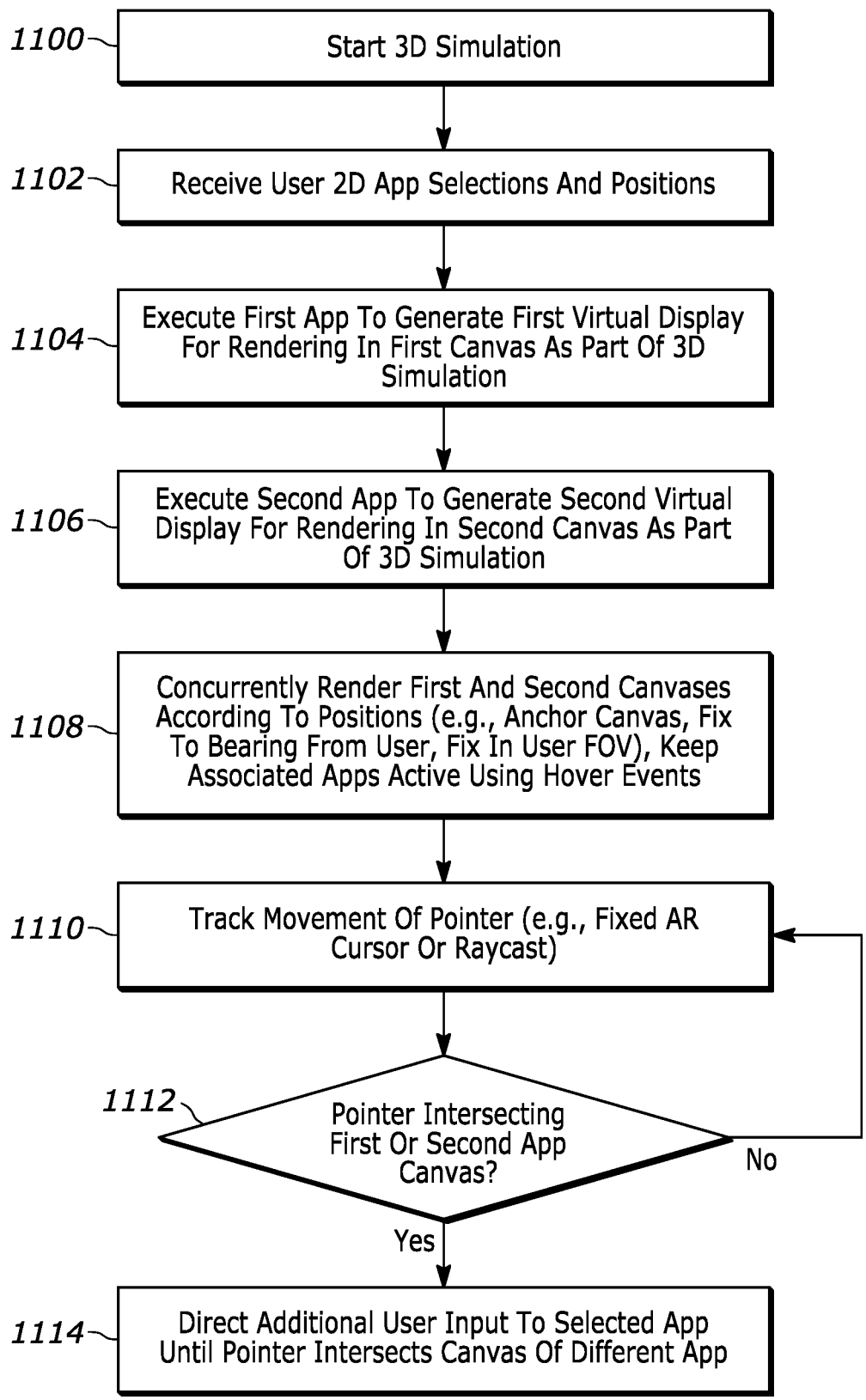
FIG. 11 illustrates example logic in example flow chart format that may be executed by a device consistent with present principles.

Continuing the detailed description in reference to FIG. 11, it shows example overall logic that may be executed consistent with present principles by a device such as the system 100, a mobile device, a headset, and/or even a coordinating server in any appropriate combination. Beginning at block 1100, the device may execute an AR/VR/MR app, such as App Space as described above (e.g., at the mobile device), to begin presenting an 3D AR/MR/VR simulation consistent with present principles. The AR/VR/MR app may be configured for interfacing presentation of content between 2D space and 3D space to thus present 2D content from a 2D app (as based in pixel coordinates) stereoscopically in 3D (as based in 3D texture coordinates established by e.g., bitmap images). Thus, in example implementations the device may execute the AR/VR/MR app to present 2D content from 2D apps in stereoscopic 3D at the connected headset. Further note that the app may be executed to receive 3D user inputs and execute other actions described above.

The logic may then move to block 1102 where the device may receive user input to select/launch one or more 2D apps in 3D space (e.g., assuming those apps are not already launched). Also at block 1102, the device may receive user input positioning the canvases for the launched apps in 3D space according to the description above. It is to therefore be understood that canvas positioning may be established/adjusted at will by the user whenever the user wants, but also may be established at the beginning of 3D rendering of the canvas and/or beginning of execution of the 3D simulation itself.

From block 1102 the logic may then proceed to block 1104 to execute a first app at the mobile phone or other device to generate a first virtual display for rendering in a first canvas as part of the 3D simulation according to the user's specified position for that app/canvas. The logic may then proceed to block 1106 where the device may execute a second app at the mobile phone or other device to generate a second virtual display for rendering in a second canvas as part of the 3D simulation according to the user's specified position for that app/canvas. Additional apps may also be concurrently executed to generate additional virtual displays for concurrent rendering in respective canvases as part of the 3D simulation as well, but only two apps, virtual displays, and canvases will be discussed below for simplicity.

From block 1106 the logic may then proceed to block 1108 where the device may concurrently render the first and second canvases at the headset as part of the 3D simulation according to the user-assigned positions. Thus, each canvas may be anchored to a 3D location, fixed to a bearing from the user, and/or fixed in the user's FOV. For example, the first app might be anchored while the second app may be fixed to a bearing from the user's torso.

Also at block 1108, in order for each associated app to not go dormant or be closed by the executing mobile device (so that its real-time content may be viewed at-will through the associated canvas in the 3D simulation), the device(s) of FIG. 11 may keep both of the first and second apps active by concurrently indicating concurrent hover events for each of the first and second apps to an operating system executing at the connected mobile device (e.g., guest operating system such as Android). Thus, whereas if the apps were being viewed through the mobile device screen and only one app would be presented at a time (with other apps put to sleep or being inactive), the logic may instead trick the operating system into keeping each app rendered in 3D space active as if it was in the mobile device display foreground so that the user may interact with each app canvas at will, and content presented through the associated canvas may be updated in real time as the associated app itself is executed by the mobile device. For example, an email inbox rendered in 3D space may be updated in the canvas responsive to an email being received even if the user's focus is directed to another app rendered in 3D space, so long as the concurrent hover events are indicated to the GOS of the mobile device.

Thereafter the logic may move to block 1110 where the device may track movement of a 3D pointer such as one controlled by raycast from the user's eyes or a hand-held controller, or one established by an AR cursor fixed in the middle of the user's field of view and that remains fixed in the user's FOV while wearing the headset even as the user moves his/her head with the headset on. The logic may then proceed to decision diamond 112 to determine in a first instance whether the 3D pointer controlled by the user intersects the first or second canvas according to the 3D simulation. A negative determination may cause the logic to move back to block 1110, but an affirmative determination may instead cause the logic to proceed to block 1114.

Accordingly, based on a determination in the first instance that the 3D pointer does indeed intersect the first or second canvas, at block 1114 the device may direct additional user input (beyond pointer positioning to intersect the associated canvas) to the first or second app selected via the pointer itself until the pointer intersects the canvas of a different app. The additional user input may include text input, scroll input, input to one or more selectors presented as part of the canvas or around the periphery of the canvas, etc. Thus, the device may continue to direct the additional user input to the associated 2D app subsequent to determining in the first instance that the 3D pointer intersects the first canvas, even the pointer moves off of the associated canvas itself so long as it does not intersect another canvas in the interim. Thus, in one specific example implementation, additional user input may be directed to the associated 2D app for the selected canvas based on determining that the 3D pointer does not currently intersect either of the first and second canvases and prior to the 3D pointer intersecting another canvas after intersecting the selected canvas in the first instance.

Moving on from FIG. 11, it is reiterated consistent with present principles that while multiple 2D mobile apps may be placed in 3D space using a headset as disclosed herein, the associated canvases of some of these apps may be locked into world space (e.g., using an spatial anchor as described above). If desired, when the user travels from one place to another in real-world space, the user may then re-anchor/ reposition those objects close to the user at the new location.

However, in addition to or in lieu of that, a "follow mode" as described above may be used by AppSpace to run on the mobile device in 3D and let the canvas of the app follow the user's spatial real-world movement using AR/MR/VR (without additional/further user input to reposition). In some specific examples, this may be implemented as a delayed follow (to avoid accidental movement of the canvas of the 2D app) where the canvas may not move instantaneously with detected user movement but instead may move after expiration of a threshold amount of time of the initial user movement, such as one second. Additionally, re-centering may occur to bring all the canvases of 2D apps being rendered in 3D space into the user's current FOV (e.g., using a voice command or selector presented on the headset display). Thus, AppSpace may implement the follow mode and recentering, as directly accessible to the user via the headset UI.

Accordingly, in one aspect AppSpace may implement the follow mode to let the 2D phone app's canvas follow the user's gaze/body movement so that the app canvas can be repositioned according to the user's gaze position and/or body movement (e.g., per a bearing to the user as described above). In some specific examples, only one app canvas may be allowed to follow the user at a time in follow mode to minimize processor and energy consumption. As indicated above, recenter functionality may also allow the user to bring all the app canvases into the user's FOV via the headset display, regardless of position in 3D space.

Figure 12:
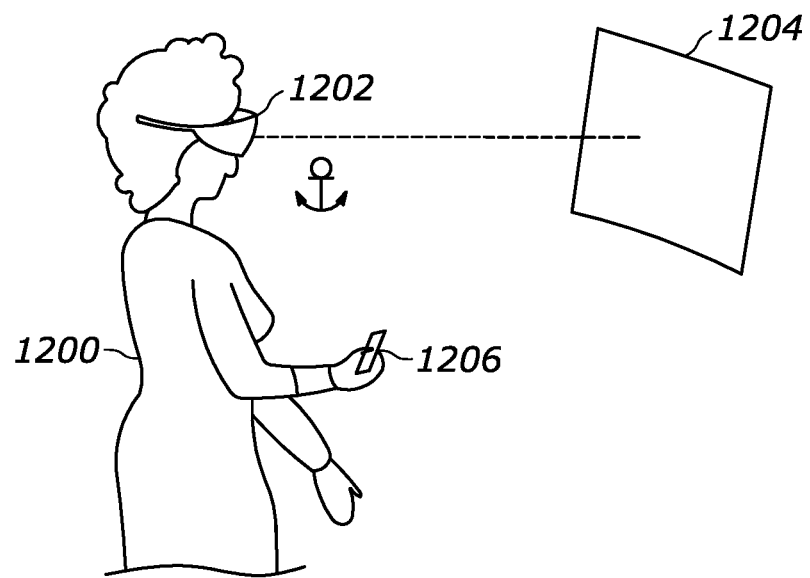
FIGS. 12 and 13 are schematics demonstrating how a user may anchor a particular canvas within 3D space consistent with present principles.
Figure 13:
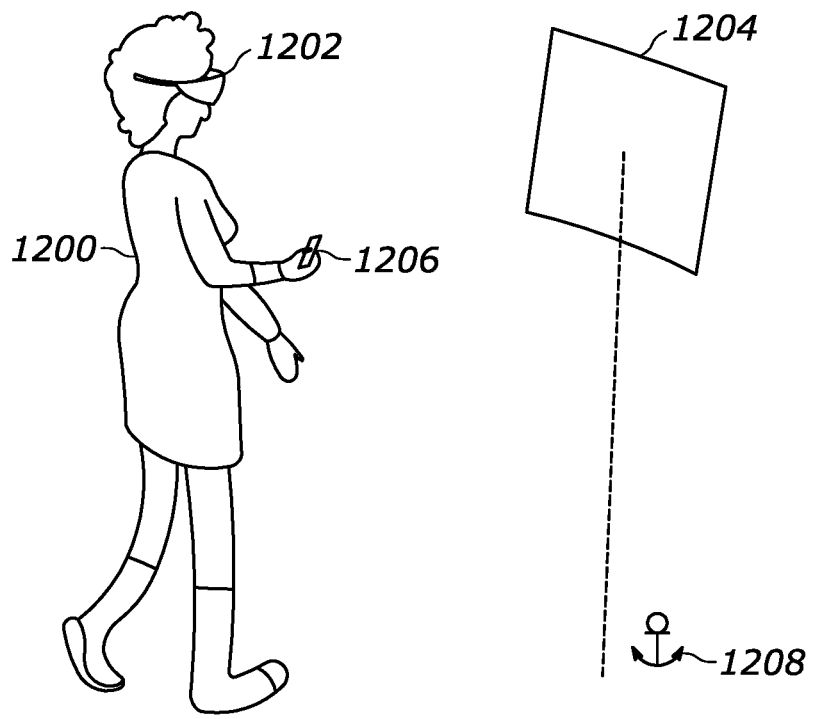

Thus, a certain canvas may be body-locked to the user via AppSpace. The user may choose to turn the follow mode on or off for any 2D app being rendered. As indicated above, only one app might be permitted to follow at any given time, and the rest of the apps may stay in a world-locked position in 3D space using a spatial anchor. FIGS. 12 and 13 therefore show a user 1200 wearing a headset 1202 to view a canvas 1204 rendered via the headset 1202 to world-lock content using AppSpace. FIG. 12 thus shows the user 1200 placing the canvas 1204 at a desired location by moving it through 3D space as locked to the user's center gaze axis. The user may then use a selector/button presented on the display of the connected mobile device 1206 to establish a spatial anchor 1208 within 3D space at which the canvas 1204 is to be locked so that, as shown in FIG. 13, the user 1202 may walk away from the canvas 1204 so that he/she cannot view it, or may walk up to the canvas 1204 to review it or even view an obverse side by walking around the back of the canvas 1204 as anchored in 3D space, just as the user 1202 could walk around a real-life lamp or table or other object to inspect different sides of it from different angles.

Figure 14:
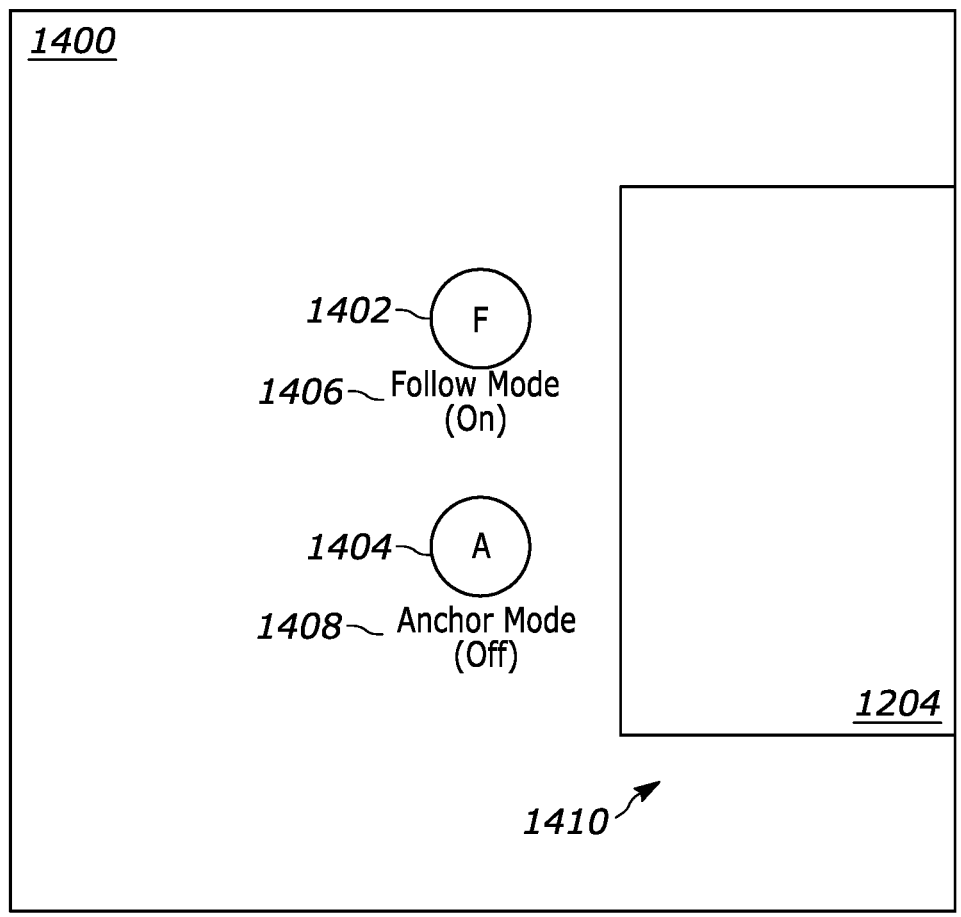
FIG. 14 shows an example of a user's FOV along with controls/selectors for switching between world-locked mode and head-locked mode consistent with present principles.

FIG. 14 then demonstrates how switching between world-locking of the canvas 1204 and head/body-locking of the canvas 1204 may occur. A FOV 1400 of a user is shown. Switching may be performed using the selectors 1402, 1404, which may hover next to the canvas 1204 and move with the canvas 1204 through 3D space just as the canvas 1204 itself moves to thus maintain the same relative positioning relative to the canvas 1204. Selector 1402 may be selected/toggled to configure the canvas 1204 in follow mode (with text indicator 1406 indicating that follow mode is currently on per this example), and selector 1404 may be selected/ toggled to configure the canvas 1204 in anchor mode for spatial anchoring per the description of FIGS. 12 and 13 above (with text indicator 1408 indicating that world-lock mode is currently off per this example).

Thus, the canvas 1204 may follow the user according to a bearing 1410 relative to the user's forward-facing torso axis so that the canvas 1204 is continually rendered at the right side of the user's FOV 1400 as the user moves through space and/or moves his or her head position. A delay may then be used so that the user may turn their head and look directly at the canvas 1204 (e.g., as identified using a 3D pointer as described above) to in turn cause associated buttons to be presented around the canvas 1204 so the user can interact with the canvas 1204 using the buttons. But if the user continues to turn their head past the canvas 1204 or the user turns slow enough for the delay to kick in and the canvas 1204 to continue to be presented on the right side of the user's FOV 1400 as the user continues to move their view to the right, the user may still be able to see other virtual content and/or real-world surroundings via the middle of the FOV 1400 since the canvas 1204 continues to be presented according to the bearing 1410 toward the right and not in the center of the FOV 1400.

It may now be appreciated that present principles provide for an improved computer-based user interface that increases the functionality and ease of use of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A first device, comprising:
   at least one processor; and
   storage accessible to the at least one processor and comprising instructions executable by the at least one processor to:
   execute a first application (app) to generate a first virtual display for rendering in a first canvas as part of a three-dimensional (3D) simulation;
   execute a second app to generate a second virtual display for rendering in a second canvas as part of the 3D simulation, the second app being different from the first app, the second virtual display being different from the first virtual display, the second canvas being different from the first canvas; and
   concurrently render the first and second canvases at a headset as part of the 3D simulation;
   wherein the first device keeps both of the first and second apps active by indicating concurrent hover events for each of the first and second apps to an operating system executing at the first device.

2. The first device of claim 1, wherein the instructions are executable to:
   render the first and second canvases in 3D space based on user input assigning respective positions for the first and second canvases.

3. The first device of claim 2, wherein the instructions are executable to:
   render the first canvas in 3D space to remain fixed at a particular 3D location associated with a spatial anchor.

4. The first device of claim 2, wherein the instructions are executable to:
   render the first canvas in 3D space to move through 3D space as a user moves through 3D space while maintaining the first canvas at a particular bearing relative to a forward-facing axis of the user's torso.

5. The first device of claim 2, wherein the instructions are executable to:
   render the first canvas in 3D space to remain stationary within a user's field of view (FOV).

6. The first device of claim 1, wherein the instructions are executable to:
   determine in a first instance that a 3D pointer controlled by a user intersects the first canvas according to the 3D simulation; and
   based on the determination in the first instance that the 3D pointer intersects the first canvas, direct additional user input to the first app.

7. The first device of claim 6, wherein the instructions are executable to:
   subsequent to determining in the first instance that the 3D pointer intersects the first canvas, prior to the 3D pointer intersecting the second canvas after intersecting the first canvas in the first instance, and based on determining that the 3D pointer does not currently intersect either of the first and second canvases, continue to direct additional user input to the first app.

8. The first device of claim 6, wherein the 3D pointer remains fixed within the user's field of view (FOV) while wearing the headset.

9. The first device of claim 6, wherein the 3D pointer is controlled by raycast.

10. The first device of claim 1, wherein the first device is different from headset.

11. The first device of claim 1, comprising the headset.

12. The first device of claim 11, comprising a mobile device that controls the headset and executes the instructions.

13. The first device of claim 1, wherein the instructions are executable to:
    responsive to launch of the first app, present one or more first graphical elements for a user to confirm placement of the first canvas as part of the 3D simulation; and
    responsive to launch of the second app, present one or more second graphical elements for the user to confirm placement of the second canvas as part of the 3D simulation.

14. A method, comprising:
    executing a first application (app) to generate a first virtual display for rendering in a first canvas as part of a three-dimensional (3D) simulation;
    executing a second app to generate a second virtual display for rendering in a second canvas as part of the 3D simulation, the second app being different from the first app, the second virtual display being different from the first virtual display, the second canvas being different from the first canvas;
    concurrently rendering the first and second canvases at a headset as part of the 3D simulation; and
    keeping both of the first and second apps active by indicating concurrent hover events for each of the first and second apps to an operating system executing at a device.

15. The method of claim 14, comprising:
    rendering the first and second canvases in 3D space based on drag and drop user input assigning respective positions for the first and second canvases.

16. The method of claim 15, comprising:
    rendering the first canvas in 3D space to move through 3D space as a user moves through 3D space while maintaining the first canvas at a particular bearing relative to a forward-facing axis of the user's torso.

17. The method of claim 14, comprising:
    determining in a first instance that a 3D pointer controlled by a user intersects the first canvas according to the 3D simulation; and
    based on determining in the first instance that the 3D pointer intersects the first canvas, directing additional user input to the first app.

18. The method of claim 17, comprising:
    subsequent to determining in the first instance that the 3D pointer intersects the first canvas, prior to the 3D pointer intersecting the second canvas after intersecting the first canvas in the first instance, and based on determining that the 3D pointer does not currently intersect either of the first and second canvases, continuing to direct additional user input to the first app.

19. The method of claim 14, comprising:
responsive to launch of the first app, presenting one or more first graphical elements for a user to confirm placement of the first canvas as part of the 3D simulation; and
responsive to launch of the second app, presenting one or more second graphical elements for the user to confirm placement of the second canvas as part of the 3D simulation.

20. At least one computer readable storage medium (CRSM) that is not a transitory signal, the at least one computer readable storage medium comprising instructions executable by at least one processor to:
execute a first application (app) to render a first canvas as part of a three-dimensional (3D) simulation;
execute a second app to render a second canvas as part of the 3D simulation, the second app being different from the first app, the second canvas being different from the first canvas;
concurrently render the first and second canvases at a headset as part of the 3D simulation; and
keep both of the first and second apps active by indicating concurrent hover events for each of the first and second apps to an operating system executing at a device.

\* \* \* \* \*